United States Patent
Inberg et al.

(10) Patent No.: US 10,598,511 B2
(45) Date of Patent: Mar. 24, 2020

(54) DETECTOR ARRANGEMENT IN CONNECTION WITH A MOBILE WORK MACHINE

(71) Applicant: Ponsse Oyj, Vieremä (FI)

(72) Inventors: Juha Inberg, Iisalmi (FI); Aleksi Kivi, Kuopio (FI)

(73) Assignee: PONSSE OYJ, Vieremä (FI)

( * ) Notice: Subject to any disclaimer, the term of this patent is extended or adjusted under 35 U.S.C. 154(b) by 279 days.

(21) Appl. No.: 14/423,926

(22) PCT Filed: Aug. 28, 2013

(86) PCT No.: PCT/FI2013/050825
§ 371 (c)(1),
(2) Date: Feb. 25, 2015

(87) PCT Pub. No.: WO2014/033365
PCT Pub. Date: Mar. 6, 2014

(65) Prior Publication Data
US 2015/0253151 A1    Sep. 10, 2015

(30) Foreign Application Priority Data
Aug. 29, 2012   (FI) .................... 20125893

(51) Int. Cl.
*B60P 1/00* (2006.01)
*E02F 9/20* (2006.01)
(Continued)

(52) U.S. Cl.
CPC ............ *G01D 1/16* (2013.01); *B60D 1/30* (2013.01); *B60D 1/62* (2013.01); *B60D 5/00* (2013.01);
(Continued)

(58) Field of Classification Search
CPC .... G01D 1/16; B60P 1/045; B60P 3/41; E02F 9/2033
(Continued)

(56) References Cited

U.S. PATENT DOCUMENTS 3,899,028 A   8/1975 Morris et al.
2001/0037164 A1 11/2001 Hecker
(Continued)

FOREIGN PATENT DOCUMENTS

CN   101999069 A   3/2011
CN   102575453 A   7/2011
(Continued)

OTHER PUBLICATIONS

Examination Report issued in the Canadian patent application dated Mar. 4, 2019.

*Primary Examiner* — Leslie J Evanisko
(74) *Attorney, Agent, or Firm* — Birch, Stewart, Kolasch & Birch, LLP

(57) ABSTRACT

The invention relates to a detector arrangement and method for determining a mutual position or a mutual state of motion of at least two structural parts of a mobile work machine. The arrangement comprises detectors configurable to determine at least in one direction of measurement at least two different measured variables in order to determine at least structural-part-specific position or state of motion information for each direction of measurement. The arrangement further comprises a data processing means for receiving measurement signals describing measured variables as well as for determining a mutual position or state of motion of the structural parts on the basis of the structural-part-specific position or state of motion information.

12 Claims, 3 Drawing Sheets

(51) Int. Cl.
*G01D 1/16* (2006.01)
*G01P 3/00* (2006.01)
*G01P 15/00* (2006.01)
*B62D 53/00* (2006.01)
*B60D 5/00* (2006.01)
*B60D 1/62* (2006.01)
*B60D 1/30* (2006.01)
*B60P 1/04* (2006.01)
*B60P 3/41* (2006.01)

(52) U.S. Cl.
CPC .............. *B60P 1/045* (2013.01); *B62D 53/00* (2013.01); *E02F 9/2033* (2013.01); *G01P 3/00* (2013.01); *G01P 15/00* (2013.01); *B60P 3/41* (2013.01)

(58) Field of Classification Search
USPC ............................................ 701/50; 702/150
See application file for complete search history.

(56) References Cited

U.S. PATENT DOCUMENTS

| | | |
|---|---|---|
| 2009/0056961 A1 | 3/2009 | Gharsalli et al. |
| 2009/0139119 A1 | 6/2009 | Janardhan et al. |
| 2012/0099955 A1 | 4/2012 | Glitza |
| 2012/0201640 A1 | 8/2012 | Jessen et al. |

FOREIGN PATENT DOCUMENTS

| | | | |
|---|---|---|---|
| CN | 102459766 A | 5/2012 | |
| EP | 0934879 A1 | 8/1999 | |
| GB | 1380029 A | 1/1975 | |
| GB | 249713 A | 6/2013 | |
| JP | 2000-203496 A | 7/2000 | |
| JP | 2003-119818 A | 4/2003 | |
| JP | WO 2011148946 A1 * | 12/2011 | ........... B66C 23/905 |
| WO | WO 96/10116 A1 | 4/1996 | |
| WO | WO 2006/093438 A1 | 9/2006 | |
| WO | WO 2013/079894 A1 | 6/2013 | |

* cited by examiner

DETECTOR ARRANGEMENT IN CONNECTION WITH A MOBILE WORK MACHINE

BACKGROUND

The invention relates to a detector arrangement in connection with a mobile work machine.

The invention further relates to a method of determining a mutual position or a mutual state of motion of at least two structural parts of a mobile work machine.

Determination of an absolute or a relative position of structural parts of mobile work machines, such as forest work units, is necessary e.g. for controlling the machines, improving the operator's work ergonomics, ensuring safe and efficient working, and managing forces to which the machine is subjected. Various solutions are known for determining the position of the structural parts. These solutions are often based on contact and/or mechanical connection, such as articulation angle measurements between two structural parts by means of a rotation angle sensor to be installed directly in a joint, such as a resolver, or, alternatively, e.g. measurements of a position of linear movement of a linear actuator controlling a rotating joint by means of resolvers or potentiometers, for instance. However, all known solutions present problems that are usually caused by the measuring methods and devices used as well as the operating manners and operating conditions of the forest work units and/or the compatibility thereof. Forest work units are, for instance, used in a varying, often slanting and rough terrain, they are subjected to mechanical impacts e.g. by branches, trunks and stumps as well as to various kinds of vibration, booms and loads arranged thereon apply forces and strains to the machines. In addition, environmental conditions, such as great variation in outside temperature as well as moisture and impurities, may harm sensors arranged particularly in connection with the structures of a forest machine or control electronics of the machine.

Determination of an angular position by using different conventional inclination detectors presents various problems. A problem with detectors based on an acceleration sensor is that other accelerations, in addition to gravitational acceleration, directed at the sensor cause distortion in an angular value. Therefore, it is usually necessary to filter a signal heavily in order to reduce these distortions, which, in turn, makes the filtered signal slower to react to changes in the angle. Detectors based on detecting angular velocity, such as gyroscope measuring devices, in turn, detect the rate of change in the angle rather than the absolute position in relation to the direction of an acceleration due to gravity vector, for instance. Consequently, errors caused by non-idealities of the measurement and measuring arrangements accumulate during use in the angular position determination based on angular velocity.

BRIEF DESCRIPTION

An object of the present invention is to provide a novel and improved detector arrangement and method for determining a mutual position or a mutual state of motion of at least two structural parts of a mobile work machine.

The solution according to the invention is characterized by what is disclosed in the independent claims.

A solution set forth in this description discloses a detector arrangement for determining a mutual position or a mutual state of motion of at least two structural parts of a mobile work machine, the structural parts being rotatable in relation to one another at least in one direction of rotation. This detector arrangement comprises at least detectors and a data processing means. These detectors may be arranged in each said structural part and used for determining at least in one direction of measurement for each direction of measurement at least two different measured variables, a first and a second measured variable, enabling at least structural-part-specific position or state of motion information on this structural part to be determined in relation to at least one predetermined angle reference. The data processing means, in turn, may receive a first and a second measurement signal describing the first and the second measured variable transmitted by the detectors and determine structural-part-specific position or state of motion information on each structural part on the basis of the first and the second measurement signal. Further, the data processing means may determine at least the mutual position or mutual state of motion of the structural parts on the basis of this structural-part-specific position or state of motion information.

In a second solution set forth in this description, the method of determining a mutual position or a mutual state of motion of at least two structural parts of a mobile work machine rotatable in relation to one another at least in one direction of rotation comprises at least the following steps. Determining at least in one direction of measurement at least two different measured variables, a first and a second measured variable, for each direction of measurement by means of detectors, the measured variables enabling at least structural-part-specific position or state of motion information on the structural part to be determined in relation to at least one predetermined angle reference. Receiving, at a data processing means, a first and a second measurement signal describing the first and the second measured variable and transmitted by the detectors. Determining each piece of the structural-part-specific position or state of motion information on the basis of the first and the second measured signal, and determining at least a mutual position or a mutual state of motion of the structural parts on the basis of this structural-part-specific position or state of motion information.

In a third solution, the mobile work machine, such as a forest work unit, comprises one of the disclosed detector arrangements.

The idea underlying the present solution is that at least structural-part-specific position or state of motion information on two structural parts is determined in each direction of measurement by means of at least two different measured variables.

An advantage of the present solution is e.g. that such a detector arrangement and method enable at least more accurate, more reliable and more swiftly responding mutual position or state of motion information on two structural parts to be produced. Further advantages of the solution are disclosed in connection with the detailed description.

The idea underlying a disclosed embodiment is that the measured variables for each direction of measurement and for each structural part comprise at least two of the following: acceleration, angular velocity, and angular acceleration.

The idea underlying a disclosed embodiment is that the detectors comprise for each direction of measurement and for each structural part at least an acceleration sensor or an inclinometer as well as an angular velocity sensor or an angular acceleration sensor.

The idea underlying a disclosed embodiment is that the detectors comprise for each direction of measurement and for each structural part a detector determining at least a direction perpendicular to a direction of an acceleration due to gravity vector, such as a point of the compass, or a magnetic field.

The idea underlying a disclosed embodiment is that the data processing means is configured to determine at least improved structural-part-specific position or state of motion information on the two structural parts such that the position or state of motion information on the structural part is determined separately on the basis of the first measured variable and the second measured variable, and that a measurement error in the position or state of motion information determined on the basis of the first measured variable is corrected by using corresponding position or state of motion information determined on the basis of the second measured variable as reference information.

The idea underlying a disclosed embodiment is that the data processing means is configured to determine at least improved mutual position or motion information on the two structural parts on the basis of the improved structural-part-specific position or motion information.

The idea underlying a disclosed embodiment is that the mutual position or the mutual state of motion comprises at least one piece of the following information: information on the absolute difference in the position of the structural parts, information on at least one articulation angle of at least one connecting structure interconnecting the structural parts, information on the angular velocity of the absolute difference in the position of the structural parts or a derivative thereof, information on the angular velocity of at least one articulation angle of at least one connecting structure interconnecting the structural parts or a derivative thereof, or information on the position or state of motion of an actuator or a structural part comprised by at least one connecting part.

The idea underlying a disclosed embodiment is that the predetermined angle reference is one of the following: acceleration due to gravity vector, direction perpendicular to the direction of the acceleration due to gravity vector, such as a point of the compass, or the earth's magnetic field.

The idea underlying a disclosed embodiment is that the structural parts comprise at least two frame parts of the mobile work machine, and that the mutual position of these structural parts comprises at least articulation angle information.

The idea underlying a disclosed embodiment is that the structural parts comprise at least one boom section of the mobile work machine or a control cabin of the mobile work machine.

The idea underlying a disclosed embodiment is that the data processing means is configured to produce a signal indicating a stability alert when the determined mutual position or mutual state of motion of the structural parts exceeds a predetermined limit value or is below it.

The idea underlying a disclosed embodiment is that at least improved structural-part-specific position or state of motion information on the two structural parts is determined such that the position or state of motion information on the structural part is determined separately on the basis of the first measured variable and the second measured variable, and that a measurement error in the position or state of motion information determined on the basis of the first measured variable is corrected by using corresponding position or state of motion information determined on the basis of the second measured variable as reference information.

The idea underlying a disclosed embodiment is that at least one kinematic variable of at least one connecting part interconnecting the structural parts is determined utilizing a determined mutual position or mutual state of motion of the structural parts.

The idea underlying a disclosed embodiment is that the kinematic variable is one of the following: absolute difference in the position of the structural parts, at least one articulation angle of at least one connecting part interconnecting the structural parts, angular velocity of the absolute difference in the position of the structural parts or a derivative thereof, angular velocity of at least one articulation angle of at least one connecting part interconnecting the structural parts or a derivative thereof, or position or state of motion of an actuator or a structural part comprised by at least one said connecting part.

BRIEF DESCRIPTION OF THE FIGURES

Some embodiments of the invention will be explained in closer detail in the accompanying drawings, in which FIGS. 1a and 1b schematically show two forest work units, FIGS. 2a and 2b schematically show from different directions some concepts and directions related to a detector arrangement, FIG. 3 schematically shows a detector arrangement.

For the sake of clarity, the figures show some embodiments of the invention in a simplified manner. In the figures, like reference numerals identify like elements.

DETAILED DESCRIPTION

Figure 1A:
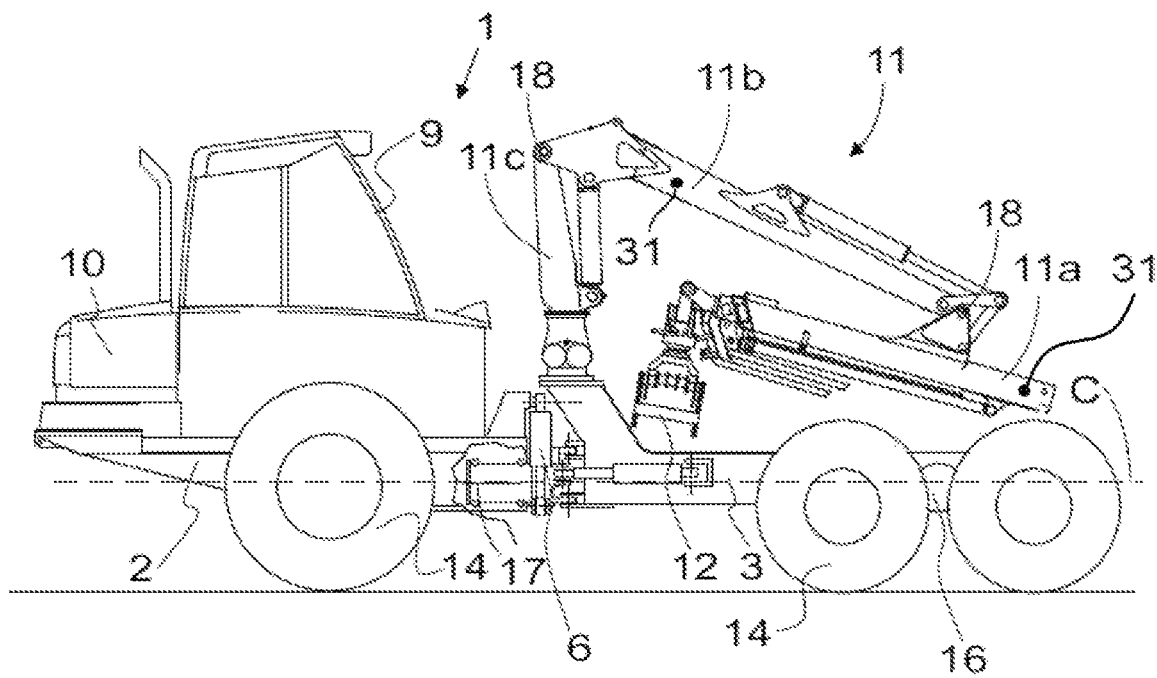
Figure 1B:
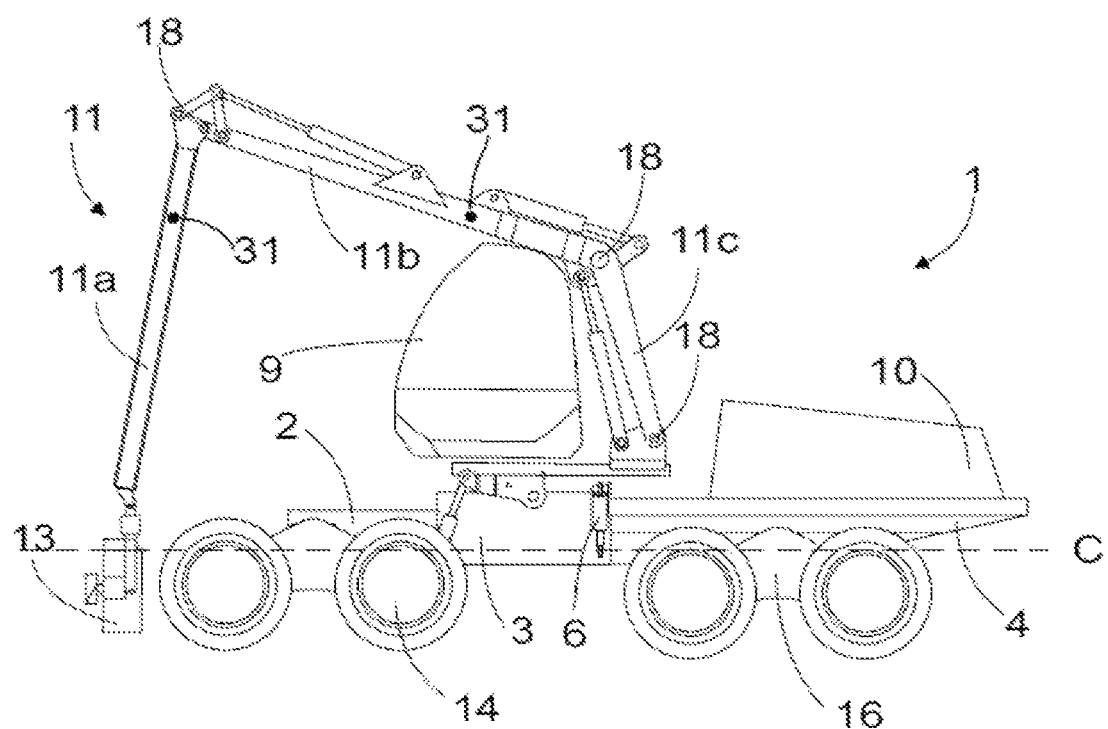

FIGS. 1a and 1b schematically show two forest work units as examples of mobile work machines 1. In the figures, like reference numerals identify parts of like structure and/or purpose. A mobile work machine 1, such as a forest work unit, a forwarder in the case of FIG. 1a and a harvester in the case of FIG. 1b, may comprise frame parts, in the case of FIG. 1a two frame parts 2, 3 joined together by articulation. Typically, the forest work unit 1 comprises a control cabin 9 arranged in one frame part 2, 3, 4, at least one power source 10, which is arranged in the same frame part 2, 3, 4 as the control cabin or in a different frame part, for generating power to move and control the forest work unit and/or the tools therein. The forest work unit 1 further comprises tools, such as a boom assembly 11, which may comprise one or more boom sections 11a, 11b, and 11c that may have been pivoted by joints 18 to one another and/or the frame part, typically arranged in one or more frame parts 2, 3, 4, and a grab 12 attached thereto in FIG. 1a or a harvester head 13 attached thereto in FIG. 1b. Such mobile forest work units 1 further comprise means for moving the forest work unit, e.g. wheels 14, block assemblies 16, foot mechanisms or other elements for movement known per se. Further, depending on the embodiment and purpose of use, the forest work units may also comprise numerous other structural parts known per se. Mobile work machines 1 of another type often comprise structural parts of like purpose; however, in particular the actual tools and their connecting structures typically vary according to the work machine and purpose of use. For the sake of clarity, this description and the other figures related thereto designate these structural parts by references 19, 19a, and 19b. Detectors 31 are arranged in at least in two structural parts 11a, 11b, 11c rotatable in relation to one another at least in one direction of rotation and which may be arranged in each said structural part 11a, 11b, 11c, and each detector 31 may be configured to determine at least in one direction of measurement at least two different measured variables, a first and a second variable, for each direction of measurement.

Typically, at least some of the aforementioned or other structural parts of the mobile work machine 1 are rotatable in relation to one another at least in one direction of rotation. Typically, this is implemented by arranging the structural parts together by means of a joint of at least one degree of freedom, but in different embodiments different structural parts may also be arranged together by joints of more degrees of freedom, in which case the structural parts may also move in relation to one another e.g. in a direction of translation, such as boom sections of telescopic type, for instance. The position and/or state of motion of these structural parts in relation to an angle reference, e.g. an acceleration due to gravity vector and the direction thereof in particular, as well as in relation to one another may be utilized for many purposes of use in the operation and control of the mobile work machine, e.g. for controlling an operational state of the work machine or for monitoring or controlling the boom assembly or a boom section, a control cabin or another structural part of the work machine in relation to one another, a frame part of the forest work unit or another structural part of the work machine or e.g. for alerting an operator of the machine to an impending loss of stability of the machine. In this context, a state of motion refers to a structural part being, in relation to a direction or directions of monitoring, at least in one direction of rotation in particular, in a stationary state or in motion, which, in turn, may be decelerating, steady, or accelerating.

Figure 2A:
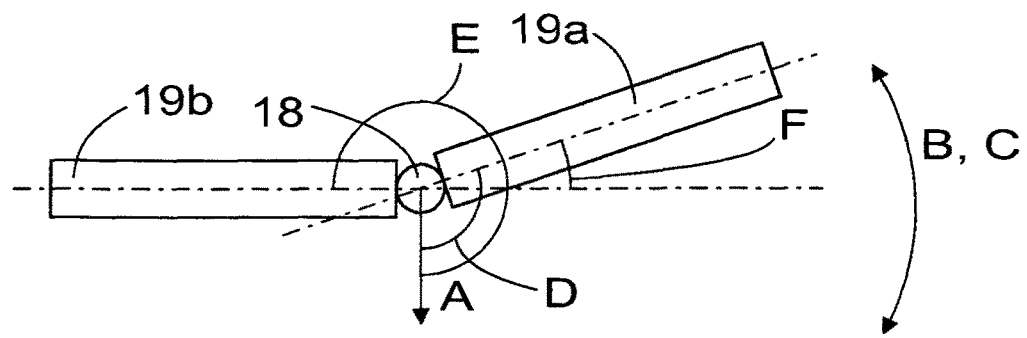
Figure 2B:
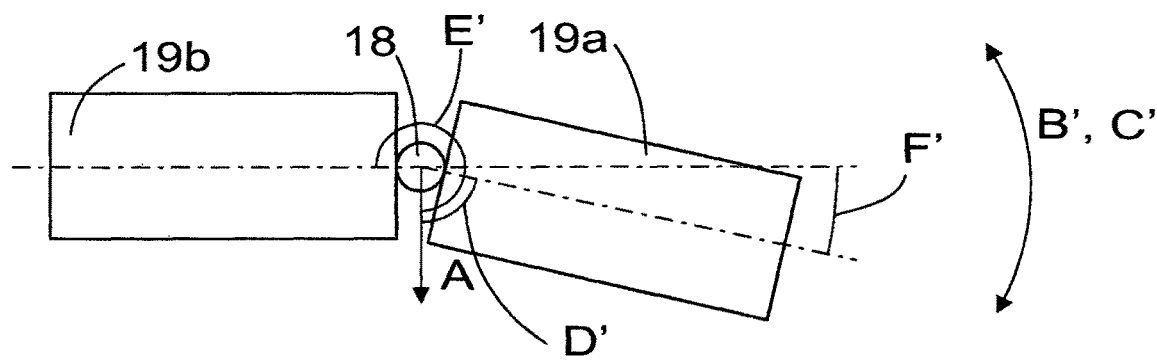

FIGS. 2a and 2b schematically show, from different directions, direction A of an angle reference, direction of rotation B, B', direction of measurement C, C', and an angular position D, D' of a structural part 19a in relation to the direction of a predetermined angle reference, an angular position E, E' of a structural part 19b in relation to the direction of the angle reference, as well as a mutual angular position F, F' between the structural parts 19a and 19b. Centre lines of the structural parts 19a and 19b are designated in broken lines. The structural parts 19a and 19b are joined together by articulation through a joint 18 of at least one degree of freedom. FIG. 2a is a side view, in which case the direction A of the angle reference may be the direction of an acceleration due to gravity vector, for instance. FIG. 2b is a top view, in which case the direction of the angle reference A may be a direction perpendicular to the acceleration due to gravity vector, e.g. a point of the compass. Preferably, the direction of measurement and the direction of rotation are substantially parallel, as shown in FIGS. 2a and 2b but, in different embodiments, depending on the purpose of use of the measurement information and e.g. structural reasons, they may also differ from one another. Naturally, the structural parts 19a and 19b may be joined together by articulation through a joint 18 of at least two degrees of freedom. The same detector arrangement may also be configured to measure the angular position and/or state of motion of the structural parts in the direction of the angle reference and in relation to one another also in more than one direction of measurement, e.g. at least in two directions of measurement C, C'. It is obvious to one skilled in the art that the determination of the angular position and/or the state of motion may then be arranged by a plurality of different detector configurations by using for each structural part detectors detecting either one or more measured variables such that each detector may be configured to detect the at least one measured variable in one or more directions of measurement.

In different embodiments, for instance an acceleration due to gravity vector, a direction perpendicular to the direction of the acceleration due to gravity vector, such as a point of the compass, the earth's magnetic field or another appropriate natural or artificial angle reference in relation to which the position and/or state of motion of the structural parts can be defined may be predetermined to be the angle reference. In some embodiments, more than one angle reference may also be used for determining the positions and/or states of motion of either the same structural part pair or different structural part pairs.

Figure 3:
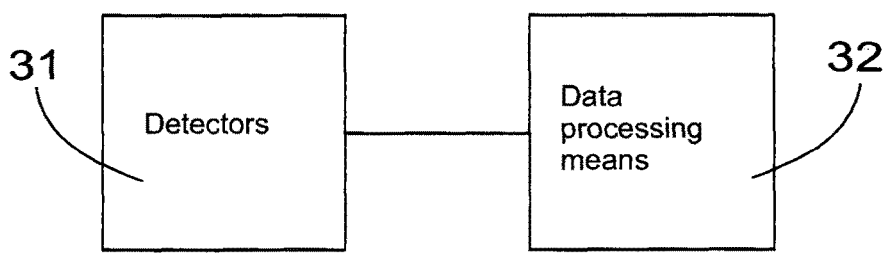

FIG. 3 schematically shows a detector arrangement for a mobile work machine. The detector arrangement in question comprises detectors 31 which are arrangeable at least in two structural parts rotatable in relation to one another at least in one direction of rotation and which may be arranged in each said structural part 19 and which detectors 31 may be configured to determine at least in one direction of measurement at least two different measured variables, a first and a second variable, for each direction of measurement. These measured variables may be selected such that they enable at least structural-part-specific position or state of motion information on the structural part 19 to be determined in relation to at least one predetermined angle reference. The detector arrangement in question further comprises at least one data processing means 32, e.g. a control unit, which may be configured to receive at least a first and a second measurement signal describing the first and the second measured variable produced by the detectors 31. Further, the data processing means 32 may be configured to determine, on the basis of the first and the second measurement signal, structural-part-specific position and/or state of motion information on each structural part 19 as well as to determine at least a mutual position and/or a mutual state of motion of the two structural parts 19 on the basis of the structural-part-specific position and/or state of motion information. Preferably, the structural-part-specific position and/or state of motion information may be determined in relation to an acceleration due to gravity vector, for instance. Preferably, the direction of measurement is substantially parallel with the direction of rotation.

In an embodiment, at least one detector 31 may be configured to determine directly a measured variable describing desired position and/or state of motion information, in which case the position and/or state of motion information may be determined directly from the measurement signal describing the measured variable in question. In some embodiments, at least one detector 31 may be configured to determine a measured variable from which the desired position and/or state of motion information can be determined computationally, e.g. by integrating or by means of another appropriate algorithm. In yet further embodiments, all detectors 31 may be configured to determine measured variables from which the desired position and/or state of motion information may be determined computationally. In other words, the position and/or state of motion information may be determined on the basis of each measured variable and the measurement signal describing it either directly or computationally.

In an embodiment, the data processing means may be configured to determine at least improved structural-part-specific position or state of motion information on the two structural parts such that the position or state of motion information on the structural part is determined separately on the basis of the first measured variable and the second measured variable, and that a measurement error in the position or state of motion information determined on the basis of the first measured variable is corrected by using corresponding position or state of motion information determined on the basis of the second measured variable as reference information. In yet another embodiment, the data processing means may be further configured to determine at least improved mutual position or state of motion information on two structural parts on the basis of the improved structural-part-specific position or motion information.

In some embodiments, the position and/or state of motion information may also be corrected by other measurement, detector or state information or by other corresponding information, e.g. acceleration information on the mobile work machine.

In an embodiment, the measured variables for each direction of measurement and for each structural part comprise at least two of the following: acceleration, angular velocity, and angular acceleration.

In an embodiment, the detector arrangement comprises detectors for determining an angular position and/or angular acceleration of each structural part being monitored in relation to a predetermined angle reference at least in one direction of measurement. In an embodiment, these detectors may for each structural part and direction of measurement being monitored comprise at least two of the following detectors: acceleration sensor, angular velocity sensor, and angular acceleration sensor. Particularly preferably, the detector arrangement comprises an acceleration sensor or an inclinometer as well as an angular velocity sensor and/or an angular acceleration sensor. In another embodiment, these detectors may for each direction of measurement and for each structural part being monitored comprise a detector determining at least a direction perpendicular to an acceleration due to gravity vector, such as a point of the compass, or a magnetic field. In yet further embodiments, these detectors of different type and/or different angle references may be combined in an appropriate manner.

Determining at least the two different measured variables for a direction of measurement and for a structural part enables measurement errors occurring in a single measured variable and caused by various disturbances to be compensated for quickly and accurately. In such a case, by combining the signals of the acceleration sensor and/or the angular velocity sensor and/or the angular acceleration sensor in order to compensate for the measurement errors it is possible to calculate the angular position and/or angular velocity of each structural part in a reliable manner. Determining the angular position and the angular velocity on the basis of the measurement signals of an acceleration sensor, angular velocity sensor or an angular acceleration sensor is known per se and thus does not need to be explained in closer detail herein. An acceleration sensor and an inclinometer are based on detecting the acceleration of movement and the gravitational acceleration of a sensor, so in connection with the disclosed solutions these sensor types correspond to each other and can be considered equal in the disclosed solutions. The use of these detectors provides for instance the advantage that the position and/or state of motion information may be determined by small, inexpensive, reliable and long-lasting detectors which may often also be arranged quite freely in the structural part being monitored. In comparison with the present solutions, durable articulation angle sensors and linear position sensors, for instance, are expensive.

In an embodiment, instead of an acceleration due to gravity vector and the direction thereof, the position and/or state of motion of a structural part may be determined in relation to another direction, e.g. a point of the compass. In determining the position and/or state of motion of a structural part e.g. in relation to a point of the compass, an electric compass, for instance, or e.g. satellite positioning data during drive may be used. A first measured variable describing the position and/or state of motion of the structural part may then be determined e.g. by some other presently disclosed detector arrangement and/or method.

In different embodiments, the detectors may thus be different devices appropriate for detecting measured variables, e.g. sensors or measuring devices.

An advantage of the present detector arrangement is that by monitoring at least two different measured variables enabling at least the position and/or state of motion information on one structural part to be determined, the first measured variable may be used as a reference measurement for the second measured variable and, correspondingly, the obtained measurement information as reference information for correcting measurement errors related to the second measured variable. This enables measurement errors related to different measuring methods, such as sensitivity to vibrations oriented in a direction of measurement associated with measuring angular information by an absolute sensor, such as an inclinometer, and accumulating errors related to computational determination to be corrected efficiently and without compromising the speed of the measurement. On the other hand, a decrease in the speed of the measurement related to heavy filtering of the measurement signal and errors in a measurement result caused by the slowness of reaction and measurement errors related to high-speed filtering are avoided. Similarly, in some embodiments, the second measured variable may be used as a reference measurement for the first measured variable and/or both measured variables may be used as reference measurements for one another for determining either the same or different position and/or state of motion information. Further, the position and/or state of motion information may also be corrected by other available measurement, detector or state information or other corresponding information.

Such an arrangement thus enables an inexpensive, compact and robust detector arrangement to be provided for detecting accurately an angular position and/or angular acceleration of a selected structural part in one or more directions of measurement. This solution enables errors in measurement results caused by accelerations, acceleration components caused by various disturbances, such as impacts, vibrations and work movements related to the use of an acceleration sensor alone to be eliminated efficiently. Consequently, the detector arrangement operates reliably also when the entire work machine moves, particularly e.g. when the work machine accelerates, decelerates and makes a curve, when the work machine moves on an uneven base, which is highly typical in connection with mobile work machines, such as forest work units, as well as when the work machine sways or vibrates due to the influence of an actuator or an external load, for instance. These disturbances interfering with the measurement are usually difficult or impossible to detect and/or filter off by conventional ways of measurement since the frequency of the disturbances may e.g. be identical to that of the actual work movements to be measured, i.e. the information to be measured. On the other hand, filtering off these disturbances from the conventional measurements also causes slowness. Another advantage of such a detector arrangement is that it enables the detectors to be arranged freely in the structural part and they do not have to be arranged e.g. in connecting parts interconnecting the structural parts, where the detectors are often subjected to unnecessary mechanical stress and e.g. to external factors, such as impacts caused by the terrain and the stand, impurities and effects of the weather as well as to other corresponding exposures shortening the service life of the detectors. Such effects include freezing and melting water, thermal expansion of ice, compacting snow and condensing water, for instance. In addition, e.g. cleaning, e.g. the use of a pressure washer, the use of efficient cleaning chemicals, are complicated and restricted by the typically mechanical sensing system, wirings and connectors on the frame since in particular the mechanical sensors and connectors of the wiring set may become damaged by these.

Figure 4:
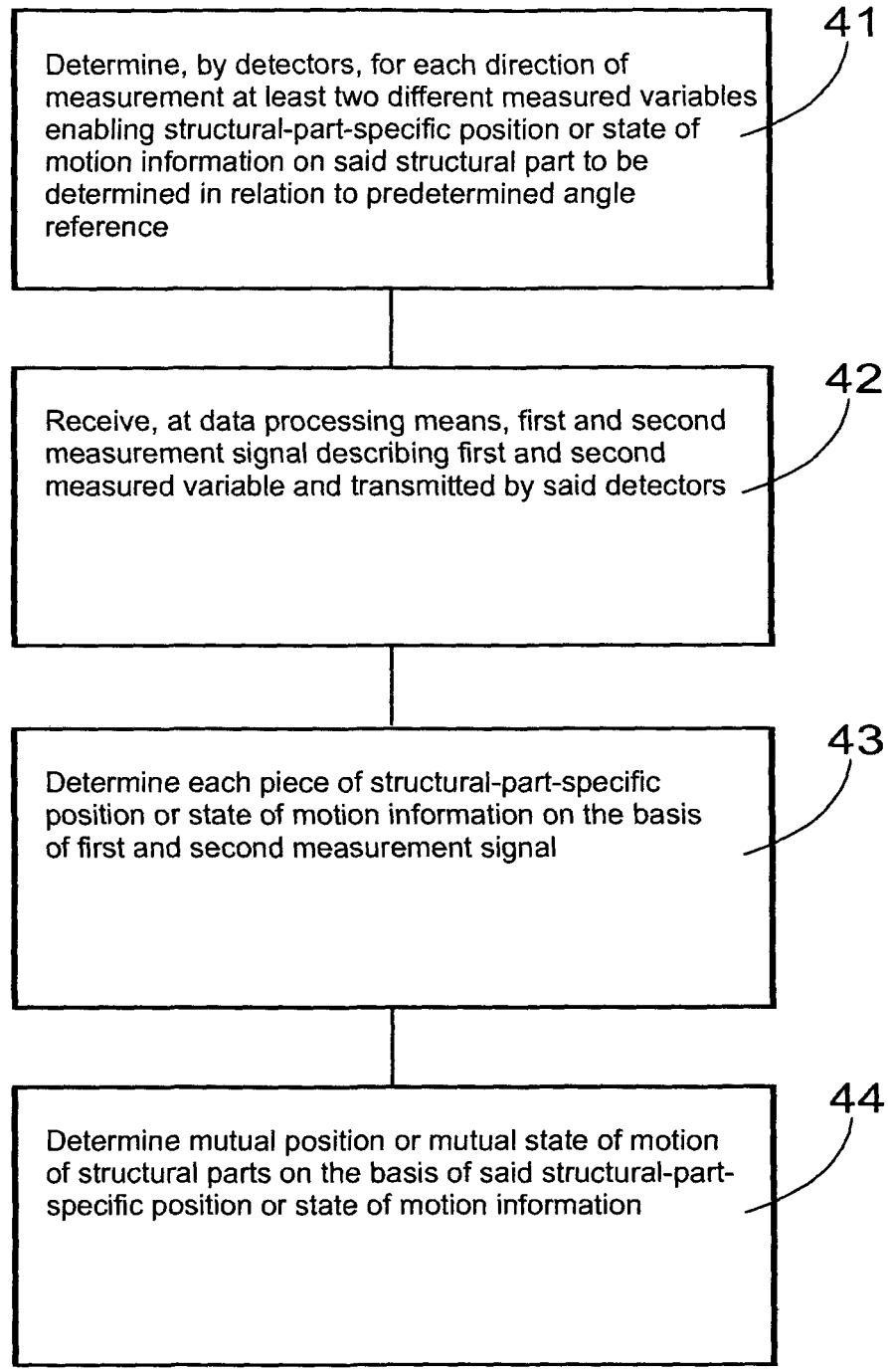
FIG. 4 schematically shows a method of determining a mutual position or a mutual state of motion of two structural parts of a mobile work machine.

The present solution thus also enables the mechanically accurate and laborious fastening, connecting, e.g. a shaft coupling, and positioning of conventional sensing systems as well as the risk of breakage caused by loosening and position changes of the joints caused by wear of the mechanism to be avoided. The sensors and wiring of the conventional sensing systems require careful protective systems that are expensive to install and service and, on the other hand, such sheltered routing of the wiring is disadvantageous as far as installation, installation costs and serviceability are concerned. FIG. 4 schematically shows a method of determining a mutual position or a mutual state of motion of at least two structural parts of a mobile work machine, the at least two structural parts being rotatable in relation to one another at least in one direction of rotation. The method of the figure comprises determining 41 at least in one direction of measurement at least two different measured variables, a first and a second measured variable, for each direction of measurement by means of detectors, the measured variables enabling at least structural-part-specific position or state of motion information on the structural part to be determined in relation to at least one predetermined angle reference. Feasible angle references have been described above e.g. in connection with the presentation of a corresponding arrangement, e.g. in connection with the description of FIGS. 1 and 2.

Further, the method comprises receiving 42, at a data processing means, a first and a second measurement signal describing the first and the second measured variable and transmitted by the detectors and determining 43 each piece of the structural-part-specific position or state of motion information on the basis of the first and the second measured signal. Next, the method comprises determining 44 at least a mutual position or a mutual state of motion of the structural parts on the basis of the structural-part-specific position or state of motion information.

In an embodiment, at least improved structural-part-specific position or state of motion information on the two structural parts may be determined such that the position or state of motion information on the structural part is determined separately on the basis of the first measured variable and the second measured variable, and that a measurement error in the position or state of motion information determined on the basis of the first measured variable is corrected by using corresponding position or state of motion information determined on the basis of the second measured variable as reference information.

In another embodiment, at least one kinematic variable of at least one connecting part interconnecting the structural parts is determined by utilizing a determined mutual position or mutual state of motion of the structural parts. In yet another embodiment, this kinematic variable is one of the following: absolute difference in the position of the structural parts, at least one articulation angle of at least one connecting part interconnecting the structural parts, angular velocity of the absolute difference in the position of the structural parts or a derivative thereof, angular velocity of at least one articulation angle of at least one connecting part interconnecting the structural parts or a derivative thereof, or position or state of motion of an actuator or a structural part comprised by at least one said connecting part.

In an embodiment, at least one kinematic variable of at least one connecting part interconnecting the structural parts 19 is determined by utilizing a determined mutual position or mutual state of motion of the structural parts. In such a case, the connecting part interconnecting the structural parts 19 may be e.g. a joint 18, an actuator 6, such as a pressure medium cylinder, e.g. a hydraulic cylinder, or another connecting structure. This kinematic variable may be e.g. one of the following: absolute difference in the position of the structural parts, at least one articulation angle of at least one connecting part interconnecting the structural parts, angular velocity of the absolute difference in the position of the structural parts or a derivative thereof, angular velocity of at least one articulation angle of at least one connecting part interconnecting the structural parts or a derivative thereof, or position or state of motion of an actuator or a structural part comprised by at least one said connecting part in relation to a perpendicular direction, such as a point of the compass, e.g. in relation to an acceleration due to gravity vector and the direction thereof, another structural part and/or direction of an acceleration due to gravity vector. The position and state of motion may then be e.g. the position/location, speed and/or acceleration of a piston of a pressure medium actuator or the position of another actuator. In such a case, it is thus possible to determine various kinematic information on the connecting structures in a reliable and accurate manner on the basis of indirect position and/or state of motion information, avoiding direct detectors to be arranged in connection with the connecting structures, problems presented by such detectors being listed above. Further, such a detector arrangement and/or method enables an accurate and reliable determination of the position and/or state of motion between structural parts to be achieved without detectors to be arranged in wear/replacement parts, such as position sensors of pressure medium cylinders in connecting structures; durable alternatives to such detectors are typically expensive, and they often have to be replaced in connection with replacement of the pressure medium cylinders even if the sensor itself was not damaged. This solution also enables a practically free placement of detectors to be used for determining the kinematic variables of such connecting parts in the structural parts interconnected by the connecting structure, in which case the detectors may be arranged in the most advantageous location as far as e.g. optimization of the service life of the detector and avoidance of different exposures and stresses are concerned.

Particularly advantageous the disclosed solution is e.g. in the determination of position and/or states of motion of large joints e.g. in control of so-called levelling and a centre joint/frame joint 17. A problem with the known solutions has been the exposure experienced by the structure to stresses caused by both the structures themselves and external factors, such as branches, stumps and the like, which shortens the service life and increases the risk of failure, as well as the difficulty of protecting the detector itself and its wiring in sites where they are subjected to mechanical stress, water, oil, snow and corresponding factors.

The detector arrangement and method disclosed above may preferably be utilized e.g. for controlling the position of a control cabin, for monitoring and controlling the position of a rotating platform of a boom assembly, boom sections or harvester head of a mobile work machine, such as a forest work unit, in relation to either one another and/or another structural part, such as the frame part. The detector arrangement disclosed above may particularly preferably be utilized also for monitoring and controlling the mutual position of the frame parts and/or boom sections, the articulation angle between the frame parts in particular, of a mobile work machine, such as a forest work unit.

In an embodiment, the detector arrangement disclosed above may be arranged in connection with a conventional data processing unit, preferably an embedded data processing unit, such as an embedded control unit. Particularly preferably the disclosed detector arrangement may be arranged inside the data processing unit and within the same housing. This is easy and inexpensive in connection with the disclosed detector arrangement, and the advantages of such a sensor to be arranged in a circuit board within the housing of a data processing unit include, e.g. in comparison with a so-called standalone sensor, a significantly lower price, efficient protection against external exposures, such as environmental factors caused by the weather (water, snow, ice, dust, temperature), chemicals, mechanical impacts and abrasions as well as electromagnetic exposures, reliable electrical connection without disturbance- and failure-sensitive connectors and wirings as well as easy, quick and inexpensive installation.

In the above-shown figures, embodiments and the related descriptions, structural parts 19 refer to any structural part 19 of a mobile work machine 1 that is at least rotatable in relation to another structural part 19 at least in one direction of rotation. The structural parts 19 whose mutual position or mutual state of motion is to be determined may be articulated to one another either directly, through different installation structures interconnecting the structural parts or by means of other structural parts. These structural parts 19 may, without being restricted thereto, comprise at least one of the following structural parts: at least one frame part 2, 3, 4, control cabin 9, at least one power source 10, boom assembly 11 or one or more boom sections 11a, 11b, and 11c, grab 12, harvester head 13, means for moving a forest work unit, e.g. at least one wheel 14, block assembly 16, foot mechanism or another element for movement known per se or at least one other structural part of the forest work unit 1 known per se. In an embodiment, the structural parts 19 comprise at least two frame parts 2, 3, 4 of a mobile work machine, such as a forest work unit, and/or boom sections, and the mutual state of motion and/or position information on these structural parts determined in the manner disclosed above comprises at least articulation angle information. In another embodiment, the structural parts 19 comprise at least one boom section of the mobile work machine or the control cabin of the mobile work machine, in which case it is possible to determine e.g. the position and/or state of motion information on the boom section or the control cabin in relation to the frame part 2, 3, 4, another boom section or another appropriate structural part of the mobile work machine.

In some embodiments, the structural parts 19 whose mutual position and/or state of motion information is being determined may be interconnected directly or by means of a connecting part. In some other embodiments, the structural parts 19 being monitored are interconnected only indirectly by means of other structural parts, for instance. Naturally, these other structural parts, too, may be arranged in connection with one another by means of joints of one or more degrees of freedom.

In an embodiment, limit values may be set for the mutual position and/or state of motion information between the structural parts 19, e.g. at least one upper or lower limit value. In such a case, the data processing means 32 may be arranged to produce a signal indicating a stability alert when the determined mutual position or mutual state of motion of the structural parts exceeds this predetermined limit value or is below it. Each limit value may be either fixed, or it may depend on the use situation, for instance. The data processing means may e.g. be configured to transmit a signal triggering a stability alert to the control system of the mobile work machine when e.g. the articulation angle between the frame parts 2, 3, 4 exceeds the upper limit value determined to be safe or otherwise appropriate for the current use situation.

In different embodiments, each detector may be used for determining one or more measured variables either directly or computationally. Further, each detector may be uni-, bi- or triaxial, so to speak, in which case each detector may be used for determining one or more measured variables in one or more directions of measurement. The directions of measurement, in turn, may be selected to be parallel with the longitudinal, transverse and/or vertical axes of the mobile work machine or parallel with any at least one desired arbitrary direction, according to the purpose and object of use.

In some cases, features disclosed in this application may be used as such, regardless of other features. On the other hand, when necessary, features disclosed in this application may be combined in order to provide various combinations.

The drawings and the related description are only intended to illustrate the idea of the invention. In its details, the invention may vary within the scope of the claims.

The invention claimed is:

1. A mobile work machine comprising at least two structural parts and a detector arrangement for determining a mutual position or a mutual state of motion of the at least two structural parts, the at least two structural parts being rotatable in relation to one another at least in one direction of rotation, wherein the detector arrangement comprises:

a plurality of detectors, at least two detectors of the plurality of detectors being arranged in each structural part among the at least two structural parts, each detector detecting a measured variable, and the at least two detectors in each structural part detecting different measured variables in relation to a predetermined angle reference; and a controller configured to:

receive a measurement signal from each detector for the respective measured variable, determine a measurement error from the at least two detectors arranged in each structural part on the basis of the respective measured variables, correct the measurement error in a first detector among the at least two detectors arranged in each structural part by using corresponding position or state of motion information determined on the basis of a second detector among the at least two detectors arranged in each structural part, and control the position of the at least two structural parts based on the determined mutual position or mutual state of motion of the at least two structural parts on the basis of the corrected position or state of motion information, wherein the at least two structural parts comprise at least two frame parts of the mobile work machine, the at least two frame parts being joined together by articulation, and wherein the mutual position of the at least two structural parts comprises at least articulation angle information.

2. The mobile work machine as claimed in claim 1, wherein the measured variables comprise at least two of the following: acceleration, angular velocity, and angular acceleration.

3. The mobile work machine as claimed in claim 1, wherein the detectors comprise an acceleration sensor or an inclinometer as well as an angular velocity sensor or an angular acceleration sensor.

4. The mobile work machine as claimed in claim 1, wherein the detectors comprise a detector determining at least a direction perpendicular to a direction of an acceleration due to gravity vector, or a magnetic field.

5. The mobile work machine as claimed in claim 1, wherein the mutual position or mutual state of motion comprises at least one piece of the following information: information on the absolute difference in the position of the at least two structural parts, information on at least one articulation angle of at least one connecting structure interconnecting the at least two structural parts, information on the angular velocity of the absolute difference in the position of the at least two structural parts or a derivative thereof, information on the angular velocity of at least one articulation angle of at least one connecting structure interconnecting the at least two structural parts or a derivative thereof, or information on the position or state of motion of an actuator or a structural part comprised by at least one said connecting part.

6. The mobile work machine as claimed in claim 1, wherein the predetermined angle reference is one of the following: acceleration due to gravity vector, direction perpendicular to the direction of the acceleration due to gravity vector or the earth's magnetic field.

7. The mobile work machine as claimed in claim 1, wherein a control cabin of the mobile work machine is arranged on one of the frame parts.

8. The mobile work machine as claimed in claim 1, wherein the controller is configured to produce a signal indicating a stability alert when the determined mutual position or mutual state of motion of the at least two structural parts exceeds a predetermined limit value or is below it.

9. A method of determining a mutual position or a mutual state of motion of at least two structural parts of a mobile work machine, the at least two structural parts being rotatable in relation to one another at least in one direction of rotation, wherein the method comprises:

providing a plurality of detectors, at least two detectors of the plurality of detectors being arranged in each structural part among the at least two structural parts, each detector detecting a measured variable, and the at least two detectors in each structural part detecting different measured variables in relation to a predetermined angle reference;

receiving, at a controller, a measurement signal from each detector for the respective measured variable;

determining, via the controller a measurement error from the at least two detectors arranged in each structural part on the basis of the respective measured variables;

correcting, via the controller, the measurement error in a first detector among the at least two detectors arranged in each structural part by using corresponding position or state of motion information determined on the basis of a second detector among the at least two detectors arranged in each structural part; and controlling, via the controller, the position of the at least two structural parts based on the determined mutual position or mutual state of motion of the at least two structural parts on the basis of the corrected position or state of motion information, wherein the at least two structural parts comprise at least two frame parts of the mobile work machine, the at least two frame parts being joined together by articulation, and wherein the mutual position of the at least two structural parts comprises at least articulation angle information.

10. The method as claimed in claim 9, wherein the method further comprises determining at least one kinematic variable of at least one connecting part interconnecting the at least two structural parts by utilizing a determined mutual position or mutual state of motion of the at least two structural parts.

11. The method as claimed in claim 10, wherein the kinematic variable is one of the following: absolute difference in the position of the at least two structural parts, at least one articulation angle of at least one connecting part interconnecting the at least two structural parts, angular velocity of the absolute difference in the position of the at least two structural parts or a derivative thereof, angular velocity of at least one articulation angle of at least one connecting part interconnecting the at least two structural parts or a derivative thereof, or position or state of motion of an actuator or a structural part comprised by at least one said connecting part.

12. A detector arrangement for determining a mutual position or a mutual state of motion of at least two structural parts of a mobile work machine, the at least two structural parts being rotatable in relation to one another at least in one direction of rotation, wherein the detector arrangement comprises:

a plurality of detectors, at least two detectors of the plurality of detectors being arranged in each said structural part among the at least two structural parts, each detector detecting a measured variable, and the at least two detectors in each structural part detecting different variables in relation to a predetermined angle reference; and a controller configured to:

receive a measurement signal from each detector for the respective measured variable, determine a measurement error from the at least two detectors arranged in each structural part on the basis of the respective measured variables, correct the measurement error in a first detector among the at least two detectors arranged in each structural part by using corresponding position or state of motion information determined on the basis of a second detector among the at least two detectors arranged in each structural part, and control the position of the at least two structural parts based on the determined mutual position or mutual state of motion of the at least two structural parts on the basis of the corrected position or state of motion information, wherein the at least two structural parts comprise at least two frame parts of the mobile work machine, and wherein the mutual position of the at least two structural parts comprises at least articulation angle information, the at least two frame parts being joined together by articulation.

* * * * *